United States Patent [19]

Noguchi et al.

[11] Patent Number: 4,590,487

[45] Date of Patent: May 20, 1986

[54] THERMAL RECORDING APPARATUS

[75] Inventors: Akio Noguchi; Haruhiko Moriguchi; Toshiharu Inui; Masayuki Hisatake, all of Kanagawa, Japan

[73] Assignee: Fuji Xerox Co., Ltd., Tokyo, Japan

[21] Appl. No.: 655,739

[22] Filed: Sep. 28, 1984

[30] Foreign Application Priority Data

Sep. 29, 1983 [JP] Japan ................................ 58-179350

[51] Int. Cl.⁴ .............................................. G01D 15/10

[52] U.S. Cl. ................................ 346/76 PH; 400/120; 219/216

[58] Field of Search .................... 346/76 PH; 400/120; 219/216

[56] References Cited

U.S. PATENT DOCUMENTS 4,454,516 6/1984 Moriguchi et al. ............ 346/76 PH 4,464,669 8/1984 Sekiya et al. ................... 346/76 PH

*Primary Examiner*—E. A. Goldberg

*Assistant Examiner*—Gerald E. Preston

*Attorney, Agent, or Firm*—Finnegan, Henderson, Farabow, Garrett & Dunner

[57] ABSTRACT

A thermal head drive circuit is provided in which the thermal energy applied during printing is corrected due to the black-white ratio, the thermal head's heat accumulation and the heat history data. The circuit includes a heat accumulation state operator, a pulse width calculator, a pulse width memory and a pulse width determining circuit. The circuit also includes a fundamental pulse width determining circuit and an auxiliary pulse width determining circuit for determining the additional pulse width to be applied with the output from the fundamental pulse width determining circuit.

7 Claims, 11 Drawing Figures

THERMAL RECORDING APPARATUS

BACKGROUND OF THE INVENTION

1. Field of the Invention

The present invention relates to thermal recording apparatus which use a thermal head to record data, and more particularly to a thermal recording apparatus in which printing is corrected.

2. Description of the Prior Art

Recording apparatus for performing thermal recording operations by using heat-sensitive sheets or transfer-type heat-sensitive recording media are extensively employed in facsimile systems, printers, etc. In such apparatus, a thermal head with individual heat generating elements arranged in a line is used for printing. As the thermal head generates heat energy for printing, the picture quality from the apparatus suffers from degradation due to accumulation of the thermal energy. Picture quality suffers primarily because of the following six factors in the recording apparatus:

(1) Heat accumulation in the thermal head;
(2) Heat history data;
(3) Temperature of the substrate of the thermal head;
(4) Differences in resistance of the heat generating elements;
(5) Differences in recording time interval; and
(6) Voltage drop due to a change in the white-black ratio.

The first factor, heat accumulation in the thermal head, is from the thermal head's individual heat generating elements which are in a particular heat accumulation state depending on the printing patterns. The heat accumulation state of an individual heat generating element is affected by secondary heat generating elements. Heat transfer between elements caused degradation in picture quality.

The second factor, heat history data, means the state of the element for printing the current line is affected by the element's state for the preceding line. In a thermal recording apparatus in which printing is carried out by changing the width and voltage of a voltage pulse (recording pulse) applied to the thermal head, the heat history data affects the printing of the next line.

The third factor, temperature of the substrate of the thermal head, refers to the temperature of the substrate on which a number of individual heat generating elements are formed.

The fourth factor, difference in resistance of the heat generating elements, refers to the fluctuation in resistance attributed to the manufacturing process. The fluctuation in resistance is such that, in one thermal head, the individual heat generating elements do not have equal resistances, and in a plurality of thermal heads, the average resistances thereof are not equal. The difference in resistance can be considerably large. The differences in resistance between elements is of the order of ±25% and average head resistance may vary from 200 Ω to 300 Ω.

The fifth factor, difference in recording time interval, refers to variations of the time from the beginning of the printing of one line until the beginning of the printing of the next line.

The sixth factor, voltage drop due to the white-black ratio, describes a phenomenon which occurs when current is applied to the individual heat generating elements, and the supply voltage drops depending on the number of black dots in the line. When the supply voltage drops, then the printing density is similarly decreased.

In order to eliminate the degradation of picture quality by the above-described five factors (1) through (5), thermal energy correction has been carried out in the art.

In order to overcome picture quality deterioration by the sixth factor, i.e., voltage drop due to the rate of occupation of black dots, a method of setting the width of the printing pulse according to the amount of the voltage drop has been proposed. In the method, the printing pulse width is uniformly set for all the individual heat generating elements; so thermal energy correction is performed completely independent of the first through fifth factors. In this method, apparatus in which thermal energy correction only prevents picture quality deterioration due to factors (1) through (5) thermal energy correction is insufficient, and the picture quality is accordingly unstable.

OBJECT OF THE INVENTION

In view of the foregoing, an object of this invention is a thermal recording apparatus in which thermal energy correction for each individual heat generating element is performed for a voltage drop due to a change in the white-black ratio.

SUMMARY OF THE INVENTION

To achieve the foregoing object, and in accordance with the purpose of the invention as embodied and broadly described herein, a thermal head drive circuit coupled to a thermal head made up of a plurality of thermal head elements, is provided which drive circuit includes a device for generating pulses to drive the thermal head and a device for modifying the drive pulses according to the percentage of thermal head elements in a line to be activiated. The device for generating drive pulses determines the width of the pulses for each element from the thermal state of neighboring elements and from the past thermal states of the element and neighboring elements.

The device for generating pulses can further include a first memory for storing the thermal states of the two thermal head elements surrounding each element and a second memory for storing the previous thermal states of the surrounding elements.

BRIEF DESCRIPTION OF THE DRAWINGS

The accompanying drawings are for a description of one embodiment of this invention.

DESCRIPTION OF THE PREFERRED EMBODIMENT

This invention will be described with reference to its preferred embodiment.

Figure 1:
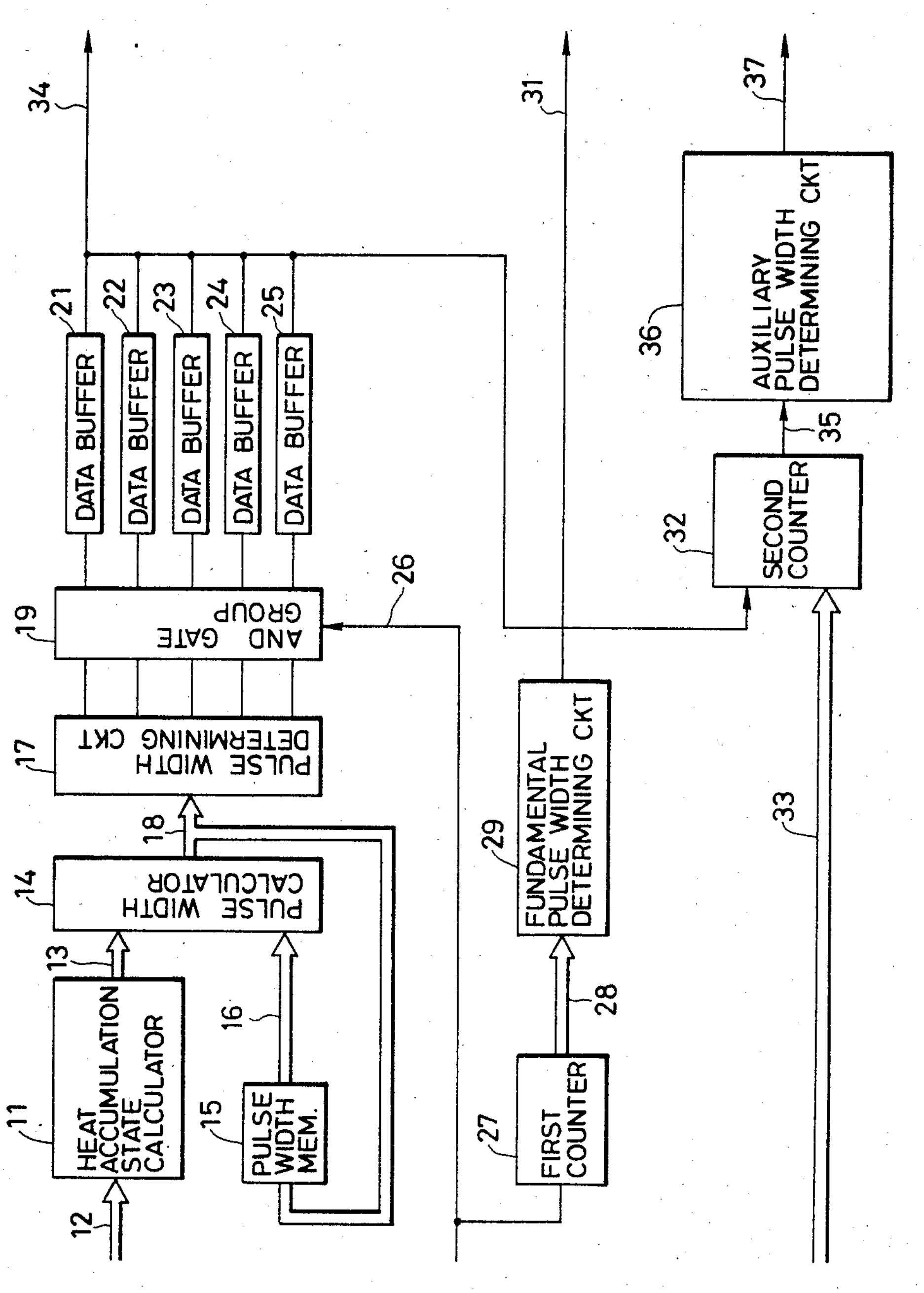
FIG. 1 is a block diagram of an embodiment of the thermal recording apparatus of this invention.

FIG. 1 is a block diagram of a thermal recording apparatus according to the present invention. In the apparatus in FIG. 1, the thermal energy to an element is corrected with the voltage drop due to a change in the white-black ratio combined with (1) the thermal head's heat accumulation and (2) the heat history data. For this purpose, in the apparatus, a heat accumulation state calculator 11 is supplied with peripheral picture data 12 to calculate the heat accumulation state. The calculation output 13 of the calculator 11 is applied to a pulse width calculator 14, where it and the preceding line pulse width data ti, denoted by designator and 16, outputted by a pulse width memory 15, are subjected to arithmetic operation. The calculation output 18 of the calculator 14 is applied to a pulse width determining circuit 17, which temporarily determines the pulse width according to the calculation output 18, to control an AND gate group 19 and to store picture information printing data 26 in five data buffers 21, 22, 23, 24 and 25.

The picture information printing data 26 is applied to a first counter circuit 27 where it is counted. According to the counting result 28 of the counter circuit 27, a fundamental pulse width determining circuit 29 determines the fundamental pulse width of a printing pulse for each individual heat generating element to output a fundamental pulse width signal 31. On the other hand, a second counter circuit 32 counts printing data 34 while selecting one of the outputs of the data buffers 21 through 25 in response to a data buffer select signal 33. The counting result 35 of the second counter circuit 32 is applied to an auxiliary pulse width determining circuit 36, to determine an additional pulse width for each individual heat generating element. The auxiliary pulse width signal 37, outputted by the circuit 36, and the fundamental pulse width signal 31 are used as the pulse width of the printing pulse of the printing data 34.

The arrangement of the thermal recording apparatus of the invention is as outlined above. Now, each circuit element of the apparatus will be described in more detail.

Figure 2:
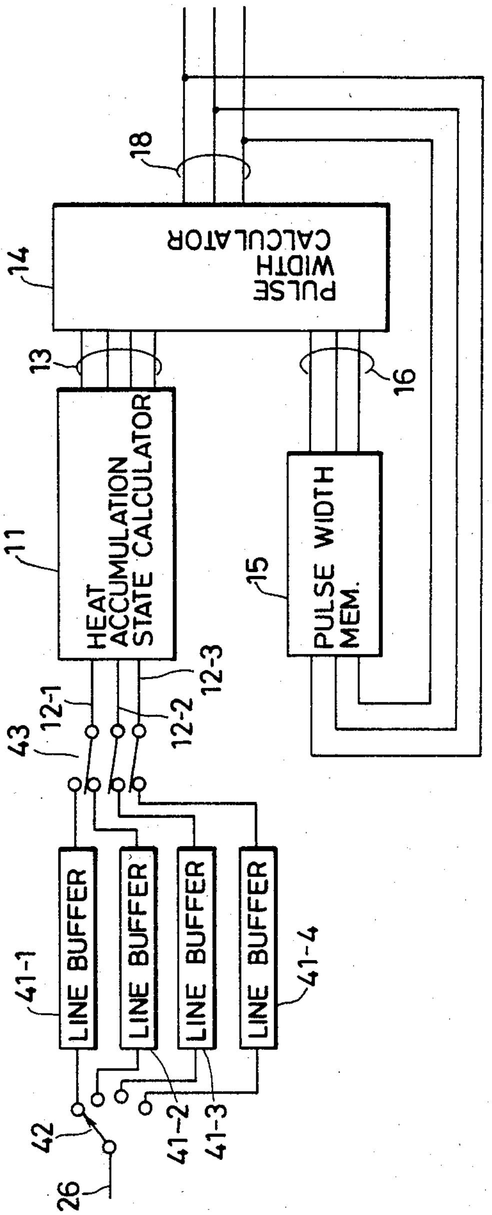
FIG. 2 is a block diagram showing a section of the apparatus in FIG. 1 which is adapted to determine a temporary pulse width.

FIG. 2 shows a section of the apparatus in FIG. 1 to determine a temporary pulse width by taking the thermal head's heat accumulation and the heat history data into account. The section comprises four line buffers 41-1, 41-2, 41-3 and 41-4 for writing the picture information printing data 26 line by line. A selector 42, receiving a line synchronizing signal (not shown), trips its armature whenever one line of picture information printing data 26 is supplied. When the selector 42 selects the first line buffer 41-1 as shown in FIG. 2, the printing data of a first line to be recorded has already been written in the fourth line buffer 41-4, the printing data of the second line located immediately before the first line has been written in the third line buffer 41-3, and the printing data of the third line located immediately before the second line has been written in the second line buffer 41-2. Provided on the output side of these line buffers 41-1 through 41-4 is a selector 43 adapted to select the three line buffers other than the line buffer in which the picture information printing data 26 is being written. In FIG. 2 since the printing data 26 is being written in the first line buffer 41-1, the state of the selector 43 is as shown in FIG. 2, so the outputs of the remaining three line buffers 41-2, 41-3 and 41-4 are selected.

The peripheral data 12-1, 12-2 and 12-3 selected by the selector 43 are applied to the heat accumulation state calculator 11 described in FIG. 1. The calculation output 13 of the calculator 11 is applied to the pulse width calculator 14.

Figure 3:
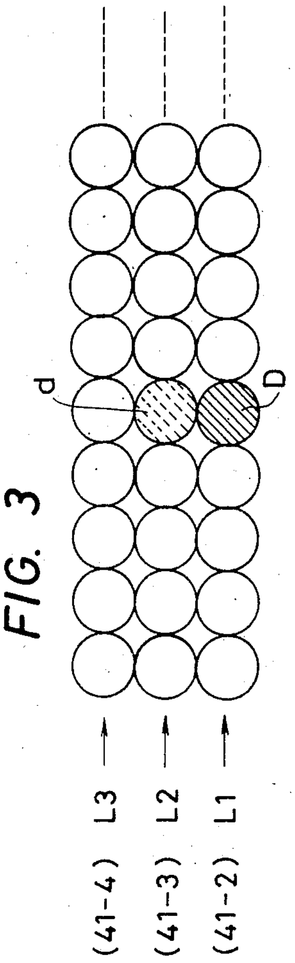
FIG. 3 is a diagram showing three data lines of the apparatus in FIG. 1.

The principle of temporarily determining a pulse width for heat accumulation state control will be described with reference to FIG. 3. In FIG. 3, a data line L1 indicates the data of a first line to be printed, a data line L2 above the data line L1 indicates the data of a second line which was printed one line earlier than the first line, and a data line L3 above the data line L2 indicates the data of a third line which was printed one line earlier than the second line.

For data D in the data line L1, the optimum pulse width applied to a heat generating element for the data is Ti, and the heat accumulation state at the position is Xi. In the data line L2, the data d is processed by the same individual heat generating element as the data D. Assume that the width of a voltage pulse applied to the individual heat generating element of the data d was ti. If the printing voltage pulse width were determined for each individual heat generating element irrespective of the rest of the printing; i.e., the printing is carried out depending on whether or not a voltage pulse is applied to another individual heat generating element, then the optimum width Ti of the voltage pulse to be applied to the individual heat generating element for the data D is:

$$Ti = f(Xi, ti)$$

Figure 4:
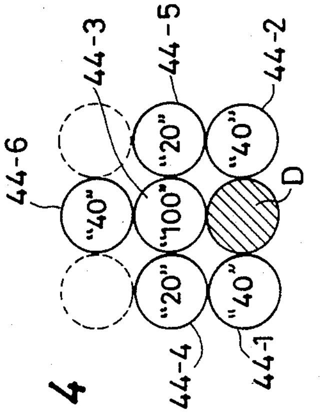
FIG. 4 is a diagram showing an element with its thermal state surrounded by elements in their thermal state.

FIG. 4 demonstrates the principle of calculating the heat accumulation state Xi in the equation. In the embodiment, the heat accumulation state Xi is calculated on the bases of six data 44-1 through 44-6 (indicated by the solid lines) located around the data D. Elements 44-1 through 44-6 correspond to the six elements surrounding element D in FIG. 3. The black ones (printing data) of these data 44-1 through 44-6 are added [to each other?] after being weighted in a predetermined manner, to obtain the heat accumulation state Xi. The weighting method is, for instance, as follows: if the weight for the data 44-3 (data d) which has the greatest thermal effect on D is 100, the weight for the data 44-1 and 44-2 in the line L1 is 40, the weight for the data 44-4 and 44-5 in the line L2 is 20, and the weight for the data 44-6 in the line L3 is 40.

In the following table, the heat accumulation state Xi obtained as described above can have seventeen (17) different values ranging from 0 to 16. In the table, Xi=0 indicates the lowest heat accumulation state, and Xi=16 indicates the highest heat accumulation state.

TABLE 1

| | | | | | | | | |
|---|---|---|---|---|---|---|---|---|
| 4 | 4-1 | 000100 | — | — | 011 | — | — | 1 |

TABLE 1-continued

| | | | | | | | | | |
|---|---|---|---|---|---|---|---|---|---|
| 4 | 4-2 | 000010 | — | — | 101 | — | — | 1 |
| 4 | 4-3 | 000000 | — | — | 111 | — | — | 1 |
| 4 | 4-4 | 010001 | — | — | 010 | — | — | 1 |
| 4 | 4-5 | 001001 | — | — | 100 | — | — | 1 |
| 4 | 4-6 | 000000 | — | — | 000 | — | — | 1 |
| X | i | 011222 | — | — | 101011 | — | — | 16 |

The heat accumulation state calculator 11 receives three lines of peripheral data 12-1, 12-2 and 12-3 to extract six data 44-1 through 44-6. The calculator 11 calculates Xi as indicated in the table with these data as address data.

Figure 5:
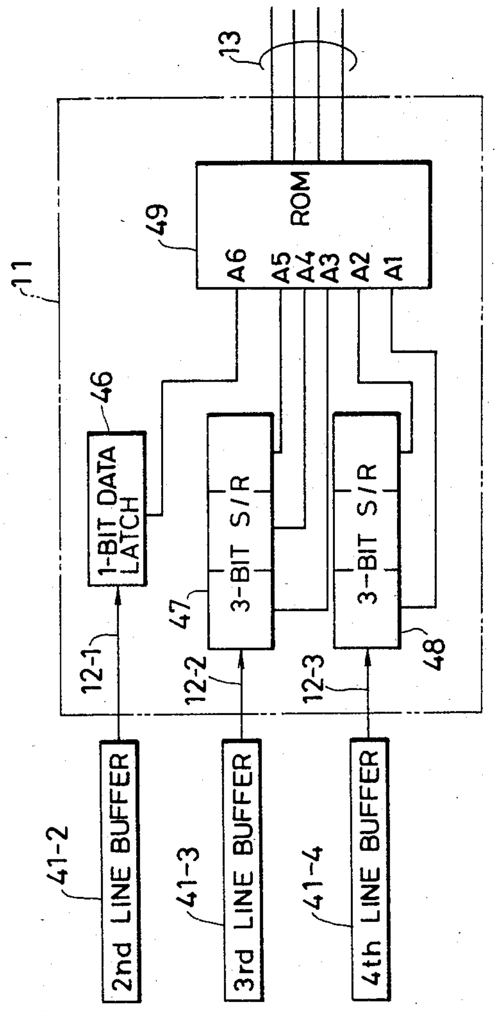
FIG. 5 is a block diagram showing part of the heat accumulation state calculator in FIG. 1.

FIG. 5 shows heat accumulation state calculator 11 adapted to calculate the heat accumulation state of the data D according to the table. In FIG. 5, selector 42 in FIG. 2 has selected the first line buffer 41. In this step, the three line buffers 41-2 through 41-4, being synchronized with one another by clock signals (not shown), start reading the printing data of one line bit by bit. The peripheral picture data which occurred two lines earlier is read out of the second line buffer 41-2 and data from the relevant head element, 41-2, is inputted into a 1-bit data latch 46 in heat accumulation state calculator 11, after being delayed by one bit by a delay element (not shown). The printing data 12-2 which occurred one line earlier than the current line is read out of the second line buffer 41 and inputted into a 3-bit shift register 47. The printing data 12-3 of the current line to be printed is read out of the fourth line buffer 41-4 and inputted into a 3-bit shift register 48.

The data latched by the 1-bit data latch 46 is supplied, bit by bit, to an address terminal A6 of a read-only memory (ROM) 49 in the heat accumulation calculator 11. The 3-bit shift register 47 performs serial-parallel conversion to supply the data to address terminals A5, A4 and A3. The 3-bit shift register 48 supplies data to address terminals A2 and A1, with the oldest data going to an address terminal A2 and the newest data going to an address terminal A1.

The values for Xi in Table 1 are stored in the ROM 49. Address terminals A1 through A6 correspond to the data 44-1 through 44-6 in Table 1, respectively. The data Xi obtained from Table 1 is the calculation output 13 from ROM 49 and supplies to the pulse width calculator 14.

Pulse width calculator 14 obtains the pulse width applied to each individual heat generating element for the preceding line from the memory output 16 of the pulse width memory 15. A "temporary" pulse width for the line to be printed is determined according to the Xi value which has been determined for each individual heat generating element.

Figure 6:
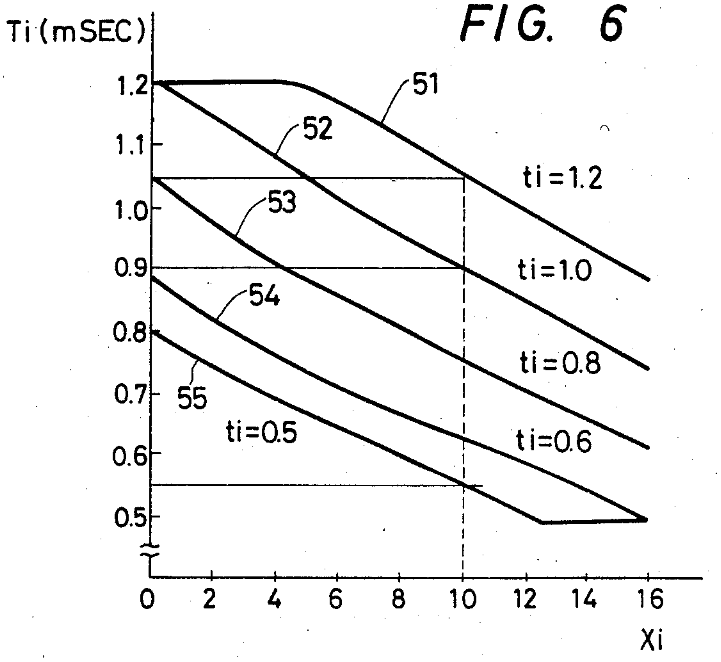
FIG. 6 is a diagram showing the relationship of a pulse width for different heat accumulation states in the pulse width calculator in FIG. 1.

FIG. 6 shows a graph for determining pulse widths in the pulse width calculator 14. In FIG. 6, the horizontal axis expresses calculation outputs corresponding to values for Xi, and the vertical axis shows pulse widths Ti (in units of milliseconds). In FIG. 6, five curves 51 through 55 indicate the relationship of pulse width Ti and heat accumulation state Xi for different values of ti, the pulse widths of the preceding lines.

Consider the case where Xi is 10 for a certain data. If, in this case, the pulse width of a voltage applied to the individual heat generating element for the preceding line is 1.2 msec (milliseconds), then the current pulse width is 1.05 msec. If the preceding pulse width is 1.0 msec, then the current pulse width is 0.9 msec. If the preceding pulse width is 0.5 msec, then the current pulse width is 0.55 msec.

The determination of the pulse width Ti is carried out by the pulse width calculator 14 using the memory 15. More specifically, the calculation output 13 and the memory output 16 are applied, as address data, to a ROM in calculator 14. The calculation output 18 representing the pulse width Ti is read out of the ROM as one of the five different values (0.5, 0.6, 0.8, 1.0 and 1.2 msec). These discrete output values are based upon the intersection of the values Xi and ti.

Figure 7:
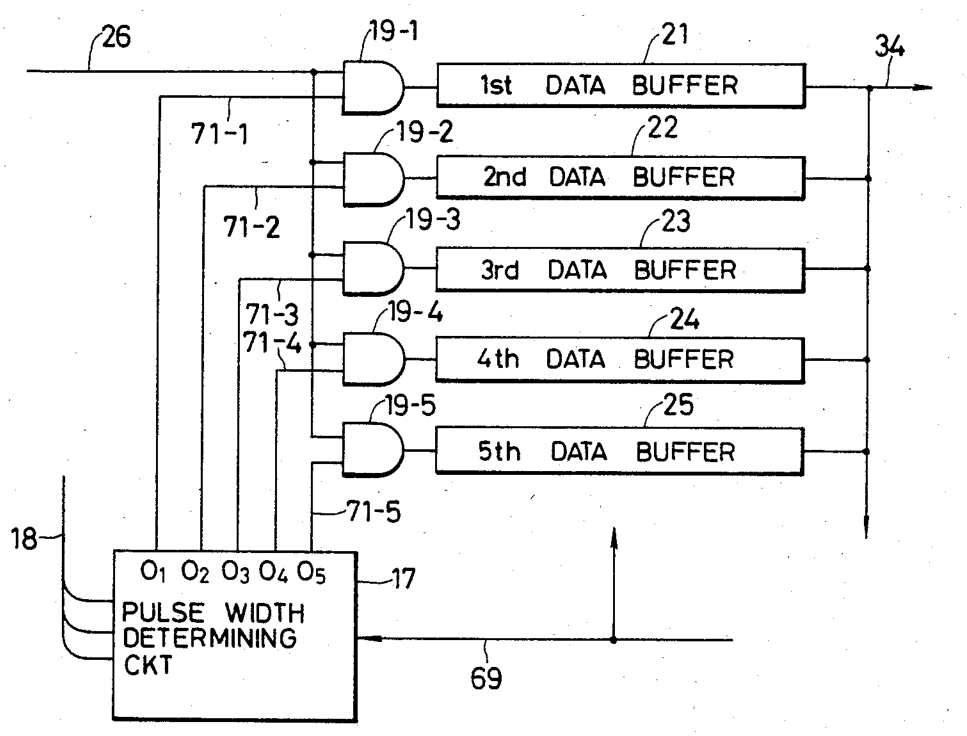
FIG. 7 is a block diagram of a section of the apparatus in FIG. 1, which assigns picture information printing data to five data buffers.

FIG. 7 shows elements 17, 19 and 21–25 in greater detail. The pulse width determining circuit 17 receives the calculation output 18 for one picture element at a time in synchronization with a clock signal 69, to provide gate control signals 71-1 through 71-5 at output terminals $O_1$ through $O_5$ separately according to the pulse widths. More specifically, when the calculation output 18 indicates Ti is 0.5 msec or more, the first gate control signal 71-1 is raised to the high level to open a first AND gate 19-1 thereby supplying the picture information printing data 26 to the first data buffer 21. When the calculation output 18 indicates Ti is 0.6 msec or more, the second gate control signal 72-1 is raised to the high level to open a second AND gate 19-2 thereby supplying the printing data 26 to the second data buffer 22. When the calculation output 18 indicates Ti is 0.8 msec or more, the third gate control signal 71-3 is raised to the high level to open a third AND gate 19-3 thereby supplying the printing data 26 to the third data buffer 23. When the calculation output 18 indicates Ti is 1.0 msec or more, the fourth gate control signal 71-4 is raised to the high level to open a fourth AND gate 19-4 thereby supplying the picture information printing data 26 to the fourth data buffer 24. Only when the calculation output 18 is 1.2 msec, the fifth gate control signal 71-5 is raised to the high level to open a fifth AND gate 19-5 thereby supplying the picture information printing data 26 to the fifth data buffer 25. These data buffers 21 through 25 store the picture information printing data 26 in synchronization with the clock signal 69 from a clock (not shown).

Figure 8:
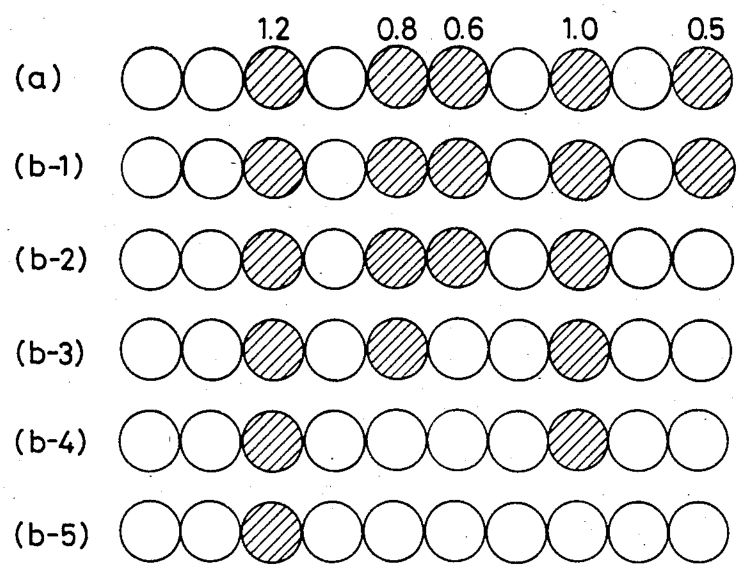
FIG. 8 is an explanatory diagram showing examples of the data in the data buffers in relation with original picture data printing data.

FIG. 8 shows the relationships of black dot data which are written in the data buffers 21 through 25 as described above. It is assumed that the original picture information printing data 26 in a raster is as indicated in the part (a) of FIG. 8. In FIG. 8, a white circle represents a non-printing data (white dot) for one picture element, and a shaded circle represents printing data for one picture element. Numerals on the printing data are the pulse widths (msec) which are temporarily determined with the thermal head's heat accumulation and heat history data corrected. Parts (b-1) through (b-5) of FIG. 8 show the printing data 34 for one raster which are written in data buffers 21–25, respectively.

Figure 9:
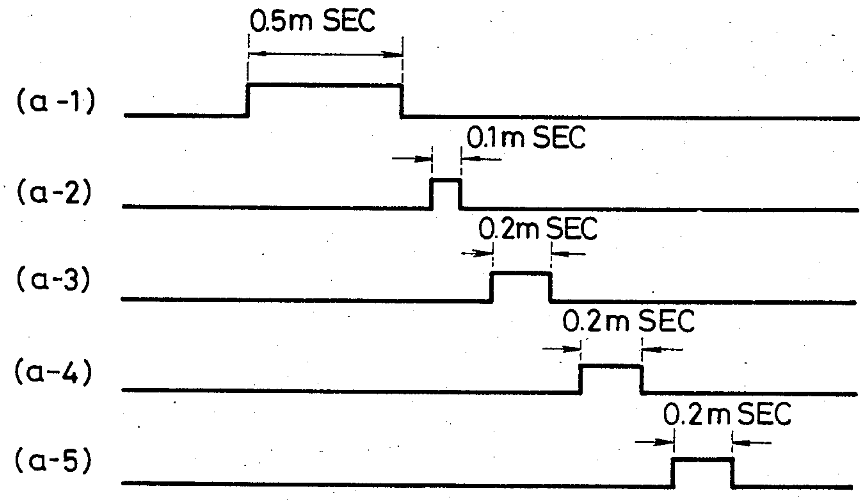
FIG. 9 is a chart indicating the timing of printing pulses.

In the conventional thermal recording apparatus, the printing is carried out according to the following system by using these printing data 34. That is, the printing data 34 read out of the first data buffer 21 are set in a shift register in the thermal head (not shown), and the printing is carried out with a recording pulse of 0.5 msec as shown in the part (a-1) of FIG. 9. Then, the recording sheet (not shown) is held at rest, and the printing data 34 is read out of the second data buffer 22, and the printing is carried out with a recording pulses of 0.1 msec as shown in the part (a-2) of FIG. 9. Similarly, the printing data 34 are read out of the third, fourth and fifth data buffers 23, 24 and 25, respectively, and the printing is carried out with a recording pulse of 0.2 msec as shown in the parts (a-3), (a-4) and (a-5) of FIG. 9. Thereafter, the recording sheet is shifted by one line in the auxiliary scanning direction, to be ready for the next printing.

In the present invention, deterioration of the picture quality is prevented when the white-black ratio changes for every raster. For example, in FIG. 8, the white-black ratio for every raster is indicated as follows. The white-black ratio in the printing data of the first raster is 50%, the white-black ratio in the printing data of the second raster is 40%, the white-black ratio in the printing data of the third raster is 30%, and so forth. The present invention corrects for the voltage changes with the white-black ratio, by adding auxiliary pulses to the thermal head elements.

As shown in FIG. 1, the picture information printing data 26 is counted for every line in the first counter circuit 27. If the white-black ratio is 50% or more, fundamental pulse width detecting circuit 29 applies the fundamental pulse width signal 31 to the thermal head when the printing data 34 in the first data are set in the thermal head.

Figure 10:
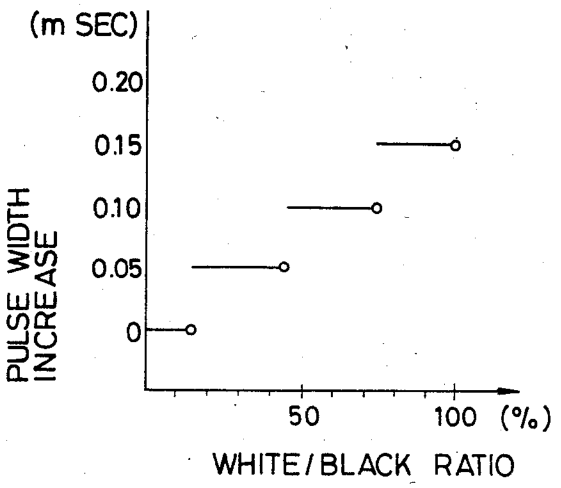
FIG. 10 is a diagram showing increases pulse widths with increases in white-black ratios.
Figure 11:
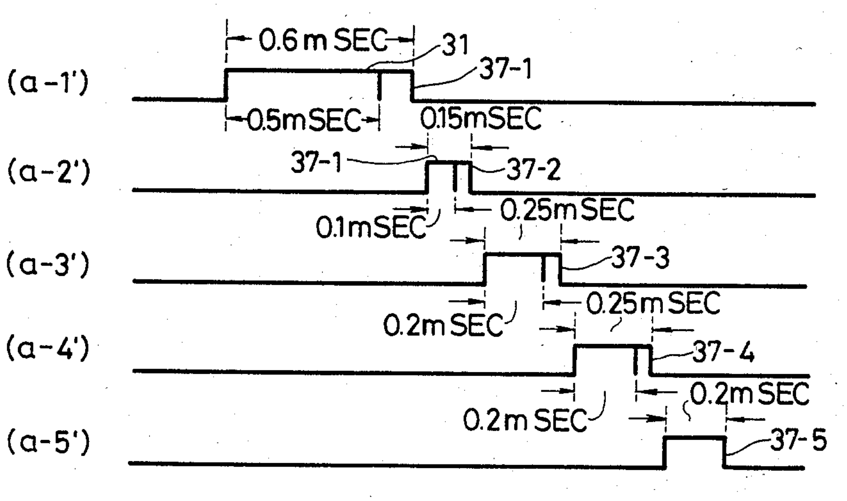
FIG. 11 is also a chart indicating the timing of printing pulses.

FIG. 10 indicates the relationship between white-black (horizontal axis) and the pulse width increase (vertical axis) needed to compensate for the accompanying voltage drop. As the white-black ratio increases, the voltage of the printing pulse is decreased and the thermal energy per unit of time likewise decreases. To adjust the thermal energy in the preferred embodiment, the printing pulse is increased by one of four signals according to the white-black ratio. As the fundamental pulse width signal 31 is based on a pulse width of 0.5 msec, the increased pulse is 0.1 msec. That is, the pulse width of the fundamental pulse width signal 31 is changed to 0.6 msec by taking the white-black ratio into account (part (a-1)′ of FIG. 11).

After the content of the first data buffer 21 has been printed with the fundamental pulse width signal 31, the content of the second data buffer 22 is outputted as the printing data 34. The printing data 34 are applied to the second counter circuit 32. When the data buffer select signal is supplied to the second counter circuit 32 from data buffer 22, second counter circuit 32 generates a preset value corresponding to the pulse width (0.1 msec) indicated in the part (a-2) of FIG. 9. In the second counter circuit 32, a value corresponding to the increased pulse width indicated in FIG. 10 is added, and the counting result 35 is outputted. In the case of the part (b-2) of FIG. 8, the white-black ratio is 40%, and therefore the increased pulse width is 0.05 msec. According to the counting result 35, the auxiliary pulse width determining circuit 36 outputs an auxiliary pulse width signal 37-2 of 0.15 msec (the part (a-2)′ of FIG. 11).

After the content of the second data buffer 22 has been printed with the auxiliary pulse width signal 37-2, the contents of the third, fourth and fifth data buffers 23, 24 and 25 similarly are outputted as printing data 34. In each case, the auxiliary pulse width is determined according to the counting result of the second counter circuit 32. In the case of FIG. 8, the white-black ratios are 30%, 20% and 10%, respectively, and the increase pulse widths are 0.05 msec, 0.05 msec and 0 msec (no increase), respectively. Accordingly, the pulse widths of the auxiliary pulse width signals 37-3, 37-4 and 37-5 are 0.25 msec, 0.25 msec and 0 msec respectively.

When the printing operations of five rasters have been accomplished as described above, the printing of one line is ended. The following lines are printed on the recording sheet with high picture quality similar to the above-described case.

In the above-described embodiment, no correction is given to the fluctuation of temperature of the thermal head's substrate, the difference in resistance of the individual heat generating elements, and the difference in printing time intervals. However, it is understood that the thermal energy correction can be achieved by suitably combining these factors.

As is apparent from the above description, according to the present invention, the printing pulse width is controlled according to the white-black ratio, i.e., the time duration of the individual heat generating elements activated for printing. Therefore, the length of the line connected between the power source and the printing section can be selected as desired, and the degree of freedom in design of the thermal printing apparatus is increased as much. Furthermore, the invention has additional merit since colors and half tones can be satisfactorily reproduced.

What is claimed is:

1. A thermal head drive circuit coupled to a source of picture data and to a thermal head made up of a plurality of thermal head elements, said circuit comprising:

a. means, coupled to said thermal head, for generating fundamental drive pulses of preset widths according to said picture data;

b. means for generating supplemental drive pulses, said generating means determining the width of said pulses for each said element from the thermal state of neighboring elements and from the past thermal states of said element and of said neighboring elements, said generating means including i. first means for storing the thermal states of the two thermal head elements surrounding each element, and ii. second means for storing the previous thermal states of said surrounding elements; and c. means for modifying said supplemental drive pulses according to the percentage of thermal head elements in a line to be activated, said modifying means including a pulse width operator coupled to said thermal head, to said first and second storing means and to said picture data source for changing the width of said supplemental drive pulses according to said picture data.

2. A thermal head drive circuit with a first input connected to a source of a data buffer select signal, and the output connected to a thermal head including individually actuatable and heatable heater elements, for printing successive lines, said circuit comprising:

a. storage means into which picture data from said picture data source are read line by line;

b. an arithmetic heat accumulation state operator connected to the output of said storage means;

c. a pulse width calculator connected to the output of said arithmetic heat accumulator state operator;

d. a first memory for storing the electrical pulse energy used in printing the next previously printed line, said first memory having an input connected to the output of said pulse width calculator and an output connected to the input of said pulse width calculator;

e. a first pulse width operator for determining the printing pulse width data to be applied to each of said heater elements for the current line to be printed, the input of said pulse width operator being connected to the output of said pulse width calculator and said source of picture information printing data;

f. a second memory connected to the output of said first pulse width operator for storing printing data information;

g. a second pulse width operator for determining the additional pulse width for each individual heater element, having inputs connected to the output of said second memory and to said source of a data buffer select signal and an output coupled to said thermal head;

h. a fundamental pulse width circuit having an input coupled to said source of picture information printing data and having an input coupled to said said thermal head, said fundamental pulse width circuit determining the fundamental pulse width for each individual heater element;

i. a plurality of line buffers into which printing data are successively read line by line;

j. a first selector for cyclically selecting an input of one of said plurality of line buffers; and k. a second selector connected to the output of said plurality of line buffers and to the input of said arithmetic head accumulation state operator for selecting the output sides of the ones of said plurality of line buffers not being selected by said first selector.

3. The thermal head drive circuit in claim 2 wherein said arithmetic heat accumulation state operator comprises means for determining an arithmetic heat accumulation state using the output data from said second selector.

4. The thermal head drive circuit in claim 3 wherein said means for determining the arithmetic heat accumulation state comprises a read-only memory.

5. The thermal head drive circuit in claim 2 wherein said first pulse width operator determining circuit comprises:

a. a pulse width determining circuit having an input connected to the output of said pulse width calculator; and b. an AND gate group having an input connected to the output of said pulse width determining circuit and said source of picture information printing data.

6. The thermal head drive circuit in claim 2 wherein said second memory comprises a plurality of data buffers.

7. The thermal head drive circuit in claim 2 wherein said second pulse width operator includes:

a. a counter having inputs coupled to the output of said second memory and said source of said data buffer select signal; and b. an auxiliary pulse width determining circuit coupled to the output of said counter and having an output coupled to said thermal head.

* * * * *